(12) United States Patent
Sato et al.

(10) Patent No.: US 7,273,206 B2
(45) Date of Patent: Sep. 25, 2007

(54) ELECTROMAGNETIC VALVE

(75) Inventors: Hideharu Sato, Tsukuba-gun (JP);
Shinichi Yoshimura, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 91 days.

(21) Appl. No.: 11/114,010

(22) Filed: Apr. 26, 2005

(65) Prior Publication Data
US 2005/0253104 A1 Nov. 17, 2005

(30) Foreign Application Priority Data
May 14, 2004 (JP) .............................. 2004-145318

(51) Int. Cl.
*F16K 31/02* (2006.01)
*H01F 3/00* (2006.01)

(52) U.S. Cl. ......................... 251/129.15; 251/129.02; 335/261; 335/297

(58) Field of Classification Search .......... 251/129.02, 251/129.15; 335/261, 297
See application file for complete search history.

(56) References Cited
U.S. PATENT DOCUMENTS
5,163,654 A * 11/1992 Borsatti et al. ........ 251/129.05

6,542,059 B2 * 4/2003 Sato et al. ............... 335/270
6,664,877 B2 * 12/2003 Sato et al. ............... 335/255
6,748,976 B2 6/2004 Sato et al.

FOREIGN PATENT DOCUMENTS

| DE | 195 06 566 A1 | 8/1996 |
|----|---------------|--------|
| DE | 102 51 851 A1 | 2/2004 |
| EP | 1 284 381 A2 | 2/2003 |
| EP | 1 284 383 A2 | 2/2003 |

* cited by examiner

*Primary Examiner*—Eric Keasel
*Assistant Examiner*—John K. Fristoe, Jr.
(74) *Attorney, Agent, or Firm*—Oblon, Spivak, McClelland, Maier & Neustadt, P.C.

(57) ABSTRACT

An electromagnetic manipulating portion of an electromagnetic valve includes a fixed iron core fixedly disposed in the inside hole of a bobbin and a movable iron core movably disposed in the inside hole and attracted to the fixed iron core by a magnetic attraction force. The fixed iron core and the movable iron core are composed of the same normally magnetic material in the same shape and in the same size and have compatibility each other.

11 Claims, 3 Drawing Sheets

ELECTROMAGNETIC VALVE

TECHNICAL FIELD

The present invention relates to an electromagnetic valve arranged to switch a valve member for switching a flow path by the action of an electromagnetic force.

PRIOR ART

An electromagnetic valve is ordinarily arranged such that it includes a main valve portion having a valve member for switching a flow path and an electromagnetic manipulating portion for manipulating the valve member, the electromagnetic manipulating portion includes an exciting coil wound around a bobbin, a fixed iron core for generating a magnetic attraction force by energizing the exciting coil, and a movable iron core attracted to the fixed iron core, and the valve member is switched by manipulating the movable iron core. Then, the fixed iron core is fixedly disposed in the bobbin, the movable iron core is movably disposed so as to come into contact and separate from the fixed iron core, and they have a different function.

Accordingly, heretofore, the fixed iron core and the movable iron core are prepared separately, and they are used for a different purpose. However, since they have a different shape according to their functions, two types of iron cores having a different shape must be prepared, and thus parts, portions, and the like relating to the iron cores must be formed in various shapes, from which a problem arises in that a long labor hour is required to design and manufacture the electromagnetic valve and a manufacturing cost is increased because the structure of the electromagnetic valve is complex.

DISCLOSURE OF THE INVENTION

An object of the present invention is to make it unnecessary to prepare two types of iron cores having a different shape by providing compatibility between a fixed iron core and a movable iron core to thereby simplify the structure of an electromagnetic valve so that the design, manufacture, and assembly jobs thereof can be executed easily as well as a manufacturing cost can be reduced.

To solve the above problems, an electromagnetic valve of the present invention includes a main valve portion having a valve member for switching a flow path and an electromagnetic manipulating portion for manipulating the valve member, wherein the electromagnetic manipulating portion includes a hollow bobbin around which an exciting coil is wound, a fixed iron core fixed in the inside hole of the bobbin, a movable iron core movably disposed in the inside hole of the bobbin, coupled with the valve member, and attracted to the fixed iron core by a magnetic attraction force generated by energizing the exciting coil, and an iron core return spring for returning the movable iron core to an initial position at which the movable iron core is spaced apart from the fixed iron core, and the fixed iron core and the movable iron core are formed in the same shape and in the same size each other and have compatibility each other.

Further, in the present invention, each of both the iron cores comprises a main portion having a predetermined sectional shape and a flange portion formed at an end of the main portion in an axial direction so as to swell in an outer peripheral direction and having a length in the axial direction shorter than that of the main portion.

In the present invention, the sectional shape of each of both the iron cores is preferably formed in an oval shape.

In this case, recesses extending in the axial direction may be formed on both the side surfaces in a minor axis direction, and flat surfaces extending in the axial direction in parallel with each may be formed on both the side surface in a major axis direction.

Further, according to a specific preferable arrangement of the present invention, both the iron cores are disposed opposite to each with the end surfaces of the main portions thereof confronting each other, the flange portion of the fixed iron core is locked to a step portion formed to an end of the bobbin, and a cap for forming a spring seat for the iron core return spring is fitted to the flange portion of the movable iron core.

According to the present invention, since the fixed iron core and the movable iron core are formed in the same shape and in the same size each other and have compatibility each other, when only one type of an iron core is prepared, it can be used as the fixed iron core and the movable iron core. Since iron cores need not be selected for use, an assembly job of the electromagnetic valve can be simplified. Moreover, the iron cores can be easily designed and manufactured as well as the dimensional accuracy of the iron cores can be enhanced, and parts can be easily managed, stored, and handles. As a result, the manufacturing cost of the electromagnetic valve can be reduced and the economical efficiency thereof can be enhanced.

DESCRIPTION OF THE PREFERRED EMBODIMENTS

Figure 1:
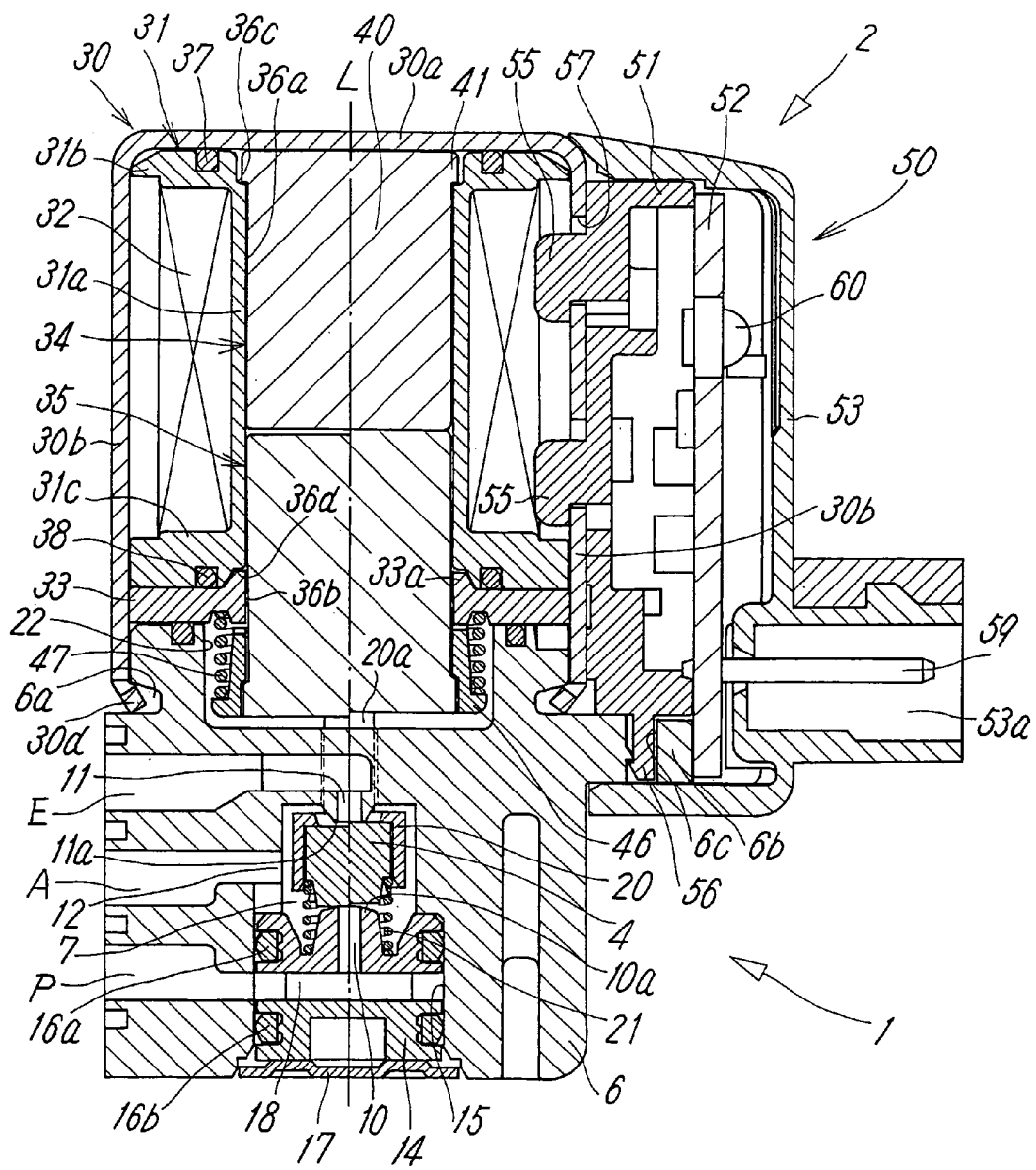
FIG. 1 is a sectional view showing an embodiment of an electromagnetic valve according to the present invention.
Figure 2:
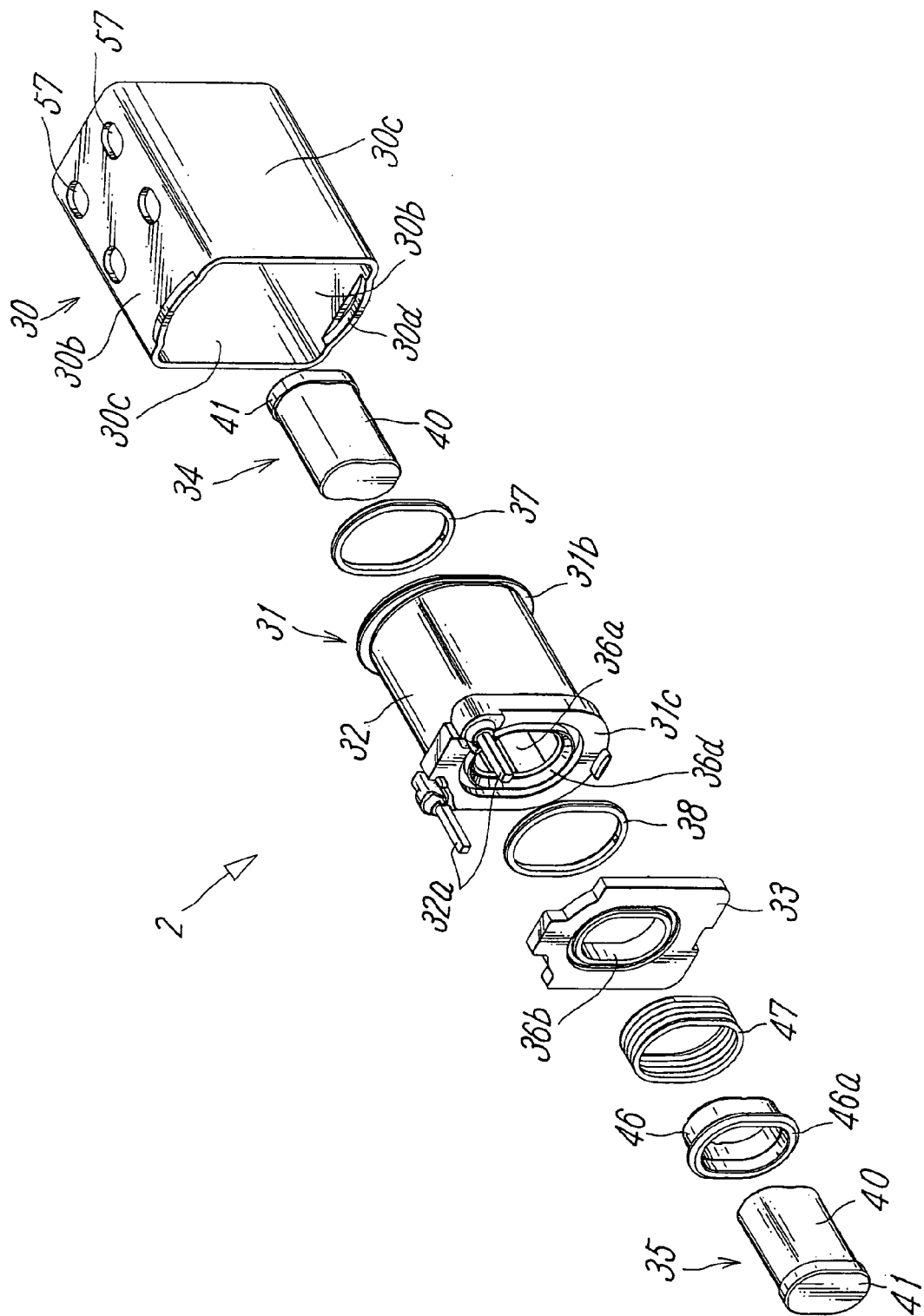
FIG. 2 is an exploded perspective view of an electromagnetic manipulating portion of the electromagnetic valve of FIG. 1.

Figures show a typical embodiment of an electromagnetic valve according to the present invention. The electromagnetic valve includes a main valve portion 1 having a valve member 4 for switching a flow path and an electromagnetic manipulating portion 2 for manipulating the valve member 4, and the main valve portion 1 is coupled with the electromagnetic manipulating portion 2 in series in the axis line L direction of the electromagnetic valve.

The main valve portion 1 includes a housing 6 having a rectangular sectional shape and formed of a non-magnetic material. A supply port P, an output port A, and a discharge port E are formed on a side surface of the housing 6. A circular valve chamber 7 is formed in the housing 6 at a position on the axis line L, and the respective ports P, A, E communicate with the valve chamber 7. Among them, the supply port P and the discharge port E communicate with the valve chamber 7 at positions confronting each other, and the output port A communicates with the valve chamber 7 at a position therebetween. That is, the supply port P communicates with the inside of the valve chamber 7 through a supply orifice 10 formed on the bottom wall of the valve chamber 7 at a position on the axis line L, the discharge port E communicates with the inside of the valve chamber 7 through a discharge orifice 11 formed on the top wall of the valve chamber 7 at a position on the axis line L, and the output port A communicates with the inside of the valve chamber 7 through an output orifice 12 formed on a side wall of the valve chamber 7.

Further, the valve member 4 of an poppet type is accommodated in the valve chamber 7 so as to be movable in the axis line L direction, and these orifices 10, 11 are opened and closed by causing a supply valve seat 10a around the supply orifice 10 to come into contact with and separate from a discharge valve seat 11a around the discharge orifice 11 by manipulating the valve member 4 by the electromagnetic manipulating portion 2. Then, when the valve member 4 closes the discharge orifice 11, the supply port P communicates with the output port A from the supply orifice 10 through the valve chamber 7 and the output orifice 12, and when the valve member 4 closes the supply orifice 10, the output port A communicates with the discharge port E from the output orifice 12 through the valve chamber 7 and the discharge orifice 11.

The supply orifice 10 and the supply valve seat 10a are disposed to a retainer 14 for partitioning an end portion of the valve chamber 7. The retainer 14 is a short columnar member and attached to the housing 6 by being inserted into an attachment hole 15 ranged an end of the valve chamber 7 from an end of the housing 6 through two seal members 16a, 16b and supported from the outside by a fixed plate 17 locked to the housing 6. A communication hole 18 communicating with the supply port P is disposed in a diameter direction in the retainer 14 at a position between the seal members 16a, 16b and communicates with the supply orifice 10.

Further, the valve member 4 is a short columnar member composed of rubber or synthetic rubber, held in a cylindrical synthetic resin valve holder 20 by being fitted thereinto, and always pushed toward the discharge valve seat 11a side by the spring force of a valve return spring 21 interposed between it and the retainer 14. A pair of push rods 20a are disposed to both the right and left side surfaces of the valve holder 20 integrally therewith so as to extend in the axis line L direction in parallel with each other, and the extreme ends of the push rods 20a extend into an iron core chamber 22 formed between the housing 6 and the electromagnetic manipulating portion 2 through a rod chamber formed in the housing 6. The iron core chamber 22 is formed in a recess disposed in the housing 6.

The electromagnetic manipulating portion 2 has a magnetic cover 30 composed of a normally magnetic material and coupled with the housing 6 of the main valve portion 1. The bobbin 31 includes a hollow bobbin 31, an annular magnetic plate 33, inside holes 36a, 36b, and a fixed iron core 34 and a movable iron core 35 each composed of a normally magnetic material disposed therein. The hollow bobbin 31 is composed of a non-magnetic material and has an exiting coil 32 wound therearound, the magnetic plate 33 is composed of a normally magnetic material and interposed between hollow bobbin 31 and the housing 6, the inside holes 36a, 36b extend across the bobbin 31 and the magnetic plate 33, and the fixed iron core 34 and the movable iron core 35 are disposed in the inside holes 36a, 36b. Note that, these inside holes 36a and 36b will be explained below with a common reference numeral "36" unless it is necessary to discriminate the inside hole 36a located in the hollow bobbin 31 and the inside hole 36b located in the magnetic plate 33.

The magnetic cover 30 is formed in a squire cylindrical shape having an approximately rectangular shape and has a top plate portion 30a covering an end side in the axis line L direction, both side plate portions 30b, 30b in a major axis direction and side plate portions 30c, 30c in a minor axis direction. Both the side plate portions 30b, 30b in the major axis direction have locking portions 30d formed with cuts at the lower ends thereof and are coupled with the housing 6 by deforming the locking portions 30d inward and locking them to the locking recesses 6a of the housing 6 on the side surfaces thereof.

The bobbin 31 has an approximately oval sectional shape and includes a central main member 31a having the exiting coil 32 wound around the outer periphery thereof and a first flange portion 31b and a second flange portion 31c formed on both the ends of the main member 31a in the axis line L direction. The first flange portion 31b at the upper end is abutted against the top plate portion 30a of the magnetic cover 30 though a seal member 37, the second flange portion 31c at the lower end is abutted against the magnetic plate 33 through a seal member 38, and the iron core chamber 22 is formed between the magnetic plate 33 and the housing 6.

Further, the inside holes 36 also have an approximately oval sectional shape. In the inside holes 36, the inside hole 36a extending into the bobbin 31 has an approximately uniform sectional shape and an approximately uniform size except both the ends thereof in the axis line L direction. However, the diameter of the inside hole 36a is slightly increased at both the ends thereof so that step portions 36c, 36d are formed at positions inside of both the flange portions 31b, 31c. Then, an annular projecting wall portion 33a formed around the inside hole 36b of the magnetic plate 33 is engaged with the step portion 36d on the second lower flange portion 31c.

Figure 3:
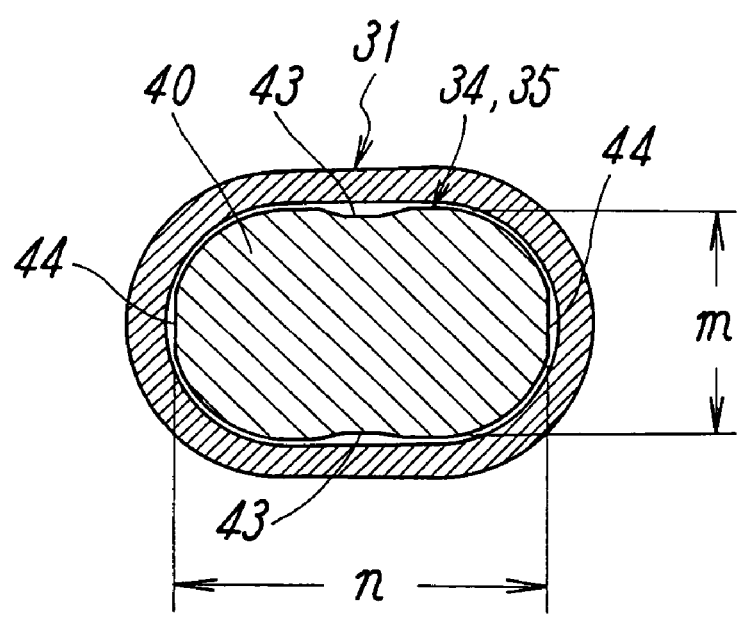
FIG. 3 is an enlarged sectional view of the main portion of the electromagnetic valve of FIG. 1 when it is cut at the position of a bobbin.

Since the fixed iron core 34 and the movable iron core 35 are formed of the same material in the same shape and in the same size so that they have the same magnetic property, they have compatibility each other and can be used in any one of the applications. That is, each of the iron cores 34, 35 has as approximately oval sectional shape having a major axis different from a minor axis and is composed of a main portion 40 having the same sectional shape over an entire length and a flange portion 41 formed at an end thereof so as to swell in an outer peripheral direction, and the length of the flange portion 41 in the axis line L direction is formed shorter than that of the main portion 40 in the axis line L direction. Further, as can be seen from FIG. 3, approximately U-shaped shallow recesses 43 extending in the axis line L direction are formed on both the side surfaces of the main portion 40 at the central portions thereof in a minor axis m direction, and flat surfaces 44, which extend in the axis line L direction in parallel with each other, are formed on both the side surfaces of the main portion 40 in a major axis n direction.

The two iron cores 34, 35 are disposed in the inside holes 36a, 36b of the bobbin 31 and the magnetic plate 33 opposite to each other with the end surfaces of the main portions 40, 40 thereof confronting each other. Then, in the fixed iron core 34, it is magnetically coupled with the magnetic cover 30 in such a manner that the end surface thereof on the flange portion 41 side is abutted against the inner surface of the top plate portion 30a of the magnetic cover 30 as well as it is fixed in such a manner that the flange portion 41 is locked to the step portion 36c on the first flange portion 31b side on the bobbin 31 so that the flange portion 41 is clamped between the step portion 36c and the top plate portion 30a. Further, in the movable iron core 35, the end thereof on the flange portion 41 side extends from the inside holes 36 into the iron core chamber 22, a ring-shaped synthetic resin cap 46 forming a spring portion is fitted to the flange portion 41, and a coil-shaped iron core return spring 47 is interposed between the flange-shaped seat portion 46a of the cap 46 and the magnetic plate 33 to return the movable iron core 35 to an initial position at which the movable iron core 35 is spaced apart from the fixed iron core 34. Accordingly, the cap 46 also has an oval sectional shape in conformity with the movable iron core 35.

As described above, since both the iron cores are composed of the same material and formed to have the same shape and the same size each other, when the electromagnetic valve is assembled, it is possible to prepare only one type of an iron core and to use it as the fixed iron core 34 and as the movable iron core 35. Accordingly, since iron cores need not be selected, an assembly job can be simplified. Since this also makes it possible to reduce the types of the iron core and the parts relating to the iron core, they can be easily designed and manufactured as well as the dimensional accuracy of the iron cores can be enhanced, and parts can be easily managed, stored, and handles. As a result, the manufacturing cost of the electromagnetic valve can be reduced and the economical efficiency thereof can be enhanced.

Moreover, as shown in the figure, the shape of each of the iron core 34, 35 is formed by the main portion 40 formed in the uniform sectional shape and having the flange portion 41 at the one end thereof. Accordingly there is an advantage in that, in the fixed iron core 34, the flange portion 41 can be simply fixed between the bobbin 31 and the magnetic cover 30 and, in the movable iron core 35, the cap 46 forming the spring portion can be simply attached to the flange portion 41 thereof.

In the electromagnetic manipulating portion 2, in the state that the exiting coil 32 is not energized, the movable iron core 35 occupies the initial position at which it is spaced apart from the fixed iron core 34 by the spring force of the iron core return spring 47 as shown in the left half portion of FIG. 1. At the time, since the push rods 20a are pushed by the movable iron core 35 and the valve member 4 is pressed against the supply valve seat 10a, the supply orifice 10 is closed and the discharge orifice 11 is opened, thereby the output port A communicates with the discharge port E through the valve chamber 7. When the exiting coil 32 is energized from this state, since the movable iron core 35 is attracted to the fixed iron core 34 and occupies an operating position, the valve member 4 is pressed against the discharge valve seat 11a by the spring force of the valve return spring 21, thereby the supply orifice 10 is opened and the discharge orifice 11 is closed. As a result, the supply port P communicates with the output port A through the valve chamber 7.

Further, a terminal portion 50 is disposed on a side surface of the electromagnetic valve to energize the electromagnetic manipulating portion 2. The terminal portion 50 includes a terminal table 51 attached across the magnetic cover 30 and the housing 6, a print-circuit board 52 held on the terminal table 51, and a detachable terminal cover 53 for covering the terminal table 51 and the print-circuit board 52. The terminal table 51 is formed in a rectangular shallow plate shape and has four hooks 55 formed on the back surface thereof and a pair of right and left locking projections 56 formed on the lower end thereof When the hooks 55 are locked to the four locking holes 57 of the side plate portions 30b of the magnetic cover 30 as well as the locking projections 56 are locked to the locking holes 6c formed to a pair of right and left projecting wall portions 6b on a side surface of the housing 6, the terminal table 51 is fixed across the magnetic cover 30 and the housing 6.

The print-circuit board 52 has an external connection terminal 59, a display lamp 60, and other electronic parts mounted thereon. Of these components, the external connection terminal 59 is electrically connected to a coil terminal 32a extending from the bobbin 31 through a printed wire on the print-circuit board 52, and the extreme end thereof extends into an insertion port 53a formed to the terminal cover 53.

Note that, although the poppet type three-port valve is shown in the embodiment, the electromagnetic valve switching system and the number of ports are not limited to those of the poppet type three-port valve. That is, the switching system may be a sprue system, and the number of the ports may be two ports, four ports, or five ports.

The invention claimed is:

1. An electromagnetic valve, comprising a main valve portion having a valve member for switching a flow path and an electromagnetic manipulating portion for manipulating the valve member, wherein the electromagnetic manipulating portion comprises,
a hollow bobbin around which an exciting coil is wound,
a fixed iron core fixed in an inside hole of the bobbin,
a movable iron core movably disposed in the inside hole of the bobbin, coupled with the valve member, and attracted to the fixed iron core by a magnetic attraction force generated by energizing the exciting coil, and
an iron core return spring for returning the movable iron core to an initial position at which the movable iron core is spaced apart from the fixed iron core, and
wherein the fixed iron core and the movable iron core are formed so as to have magnetic properties that are the same, to have an external overall surface shape that is the same, and to have overall external size dimensions that are the same so that the fixed iron core and the movable iron core have compatibility so as to be interchangeable with each other, and wherein the fixed iron core and the moveable iron core each comprise a main portion having a same predetermined sectional shape and size dimension and flange portion of the same external shape and size dimensions formed at an end of the main portion in an axis line direction so as to swell to a same extent in an outer peripheral direction and having a length in the axis line direction shorter than that of the main portion.

2. The electromagnetic valve according to claim 1, wherein the sectional shape of each of the fixed iron core and the movable iron core is an oval shape.

3. The electromagnetic valve according to claim 2, wherein the main portion of the fixed iron core and the movable iron core each has same size recesses formed in exterior side surfaces opposite to each other in a minor axis direction of the oval shape, the same size recesses extending in the axis line direction on the opposite exterior side surfaces.

4. The electromagnetic valve according to claim 3, wherein the main portion of the fixed iron core and the movable iron core each has exterior flat surfaces formed opposite to each other in a major axis direction of the oval shape and extending in parallel with each other in the axis line direction on the exterior flat surfaces.

5. The electromagnetic valve according to claim 4, wherein the fixed iron core and the movable iron core are disposed opposite to each other with end surfaces of the main portions thereof confronting each other, the flange portion of the fixed iron core is locked to a step portion formed to an end of the bobbin, and a cap for forming a spring seat for the iron core return spring is fitted to the flange portion of the movable iron core.

6. The electromagnetic valve according to claim 3, wherein the fixed iron core and the movable iron core are disposed opposite to each other with end surfaces of the main portions thereof confronting each other, the flange portion of the fixed iron core is locked to a step portion formed to an end of the bobbin, and a cap for forming a spring seat for the iron core return spring is fitted to the flange portion of the movable iron core.

7. The electromagnetic valve according to claim 2, wherein the main portion of the fixed iron core and the movable iron core each has exterior flat surfaces formed opposite to each other in a major axis direction of the oval shape and extending in parallel with each other in the axis line direction on the exterior flat surfaces.

8. The electromagnetic valve according to claim 7, wherein the fixed iron core and the movable iron core are disposed opposite to each other with end surfaces of the main portions thereof confronting each other, the flange portion of the fixed iron core is locked to a step portion formed to an end of the bobbin, and a cap for forming a spring seat for the iron core return spring is fitted to the flange portion of the movable iron core.

9. The electromagnetic valve according to claim 2, wherein the fixed iron core and the movable iron core are disposed opposite to each other with end surfaces of the main portions thereof confronting each other, the flange portion of the fixed iron core is locked to a step portion formed to an end of the bobbin, and a cap for forming a spring seat for the iron core return spring is fitted to the flange portion of the movable iron core.

10. The electromagnetic valve according to claim 1, wherein the fixed iron core and the movable iron core are disposed opposite to each other with end surfaces of the main portions thereof confronting each other, the flange portion of the fixed iron core is locked to a step portion formed to an end of the bobbin, and a cap for forming a spring seat for the iron core return spring is fitted to the flange portion of the movable iron core.

11. The electromagnetic valve according to claim 1, wherein the sectional shape of each of the fixed iron core and the movable iron core is an oval shape.

* * * * *